(12) United States Patent  
Cook et al.

(10) Patent No.: US 8,184,799 B2
(45) Date of Patent: *May 22, 2012

(54) CALL SETUP REQUEST CONFIRMATION

(75) Inventors: Debra Lee Cook, Tinton Falls, NJ (US); Gerald Joseph Kersus, Wall, NJ (US)

(73) Assignee: AT&T Intellectual Property II, LP, Atlanta, GA (US)

(*) Notice: Subject to any disclaimer, the term of this patent is extended or adjusted under 35 U.S.C. 154(b) by 886 days.

This patent is subject to a terminal disclaimer.

(21) Appl. No.: 12/252,617

(22) Filed: Oct. 16, 2008

(65) Prior Publication Data

US 2009/0034515 A1 Feb. 5, 2009

Related U.S. Application Data

(63) Continuation of application No. 10/336,949, filed on Jan. 6, 2003, now Pat. No. 7,450,563.

(51) Int. Cl.
*H04M 7/00* (2006.01)

(52) U.S. Cl. .................. 379/221.14; 370/352; 370/93.15

(58) Field of Classification Search .......... 370/352–356, 370/401; 379/207.02, 207.04, 207.05, 207.06, 379/90.01, 93.05
See application file for complete search history.

(56) References Cited

U.S. PATENT DOCUMENTS

| 4,924,493 | A | * | 5/1990 | Dang et al. | 379/93.17 |
| 4,979,206 | A | * | 12/1990 | Padden et al. | 379/88.01 |
| H0001714 | H | * | 3/1998 | Partridge, III | 348/14.01 |
| 6,104,397 | A | * | 8/2000 | Ryan et al. | 715/846 |
| 6,366,577 | B1 | * | 4/2002 | Donovan | 370/352 |
| 6,665,375 | B1 | * | 12/2003 | Forlenza et al. | 379/52 |
| 6,870,918 | B1 | * | 3/2005 | Crowson et al. | 379/207.02 |
| 7,224,788 | B1 | * | 5/2007 | Rhee et al. | 379/207.02 |
| 2002/0009071 | A1 | * | 1/2002 | Yaary et al. | 370/352 |
| 2002/0058502 | A1 | * | 5/2002 | Stanforth | 455/422 |
| 2003/0072330 | A1 | * | 4/2003 | Yang et al. | 370/493 |
| 2007/0160031 | A1 | * | 7/2007 | Sylvain | 370/352 |

* cited by examiner

*Primary Examiner* — Melur Ramakrishnaiah
(74) *Attorney, Agent, or Firm* — Akerman Senterfitt; Michael K. Dixon; Roy Zachariah

(57) ABSTRACT

At least one exemplary embodiment of the present invention includes a method comprising receiving a call setup request, and automatically providing an indication that the call setup request is being processed. At least one exemplary embodiment of the present invention includes a method comprising providing a call setup request to a network, and receiving an indication that the call setup request is being processed. It is emphasized that this abstract is provided to comply with the rules requiring an abstract that will allow a searcher or other reader to quickly ascertain the subject matter of the technical disclosure. This abstract is submitted with the understanding that it will not be used to interpret or limit the scope.

16 Claims, 5 Drawing Sheets

CALL SETUP REQUEST CONFIRMATION

BACKGROUND

In certain telecommunications architectures, such as Voice over IP, there can be noticeable call setup delays or post-dial delays (PDD). When such delays are sufficiently long, the caller can hear extended silence and thereby become confused and/or frustrated by the perception that the call is not proceeding. Accordingly, the caller can needlessly hang-up and re-dial.

SUMMARY

At least one exemplary embodiment of the present invention includes a method comprising receiving a call setup request, and automatically providing an indication that the call setup request is being processed.

At least one exemplary embodiment of the present invention includes a method comprising providing a call setup request to a network, and receiving an indication that the call setup request is being processed.

At least one exemplary embodiment of the present invention includes a graphical user interface comprising a visual rendering of a call setup request indication, said visual rendering ceasing upon receipt of a result of a call setup request.

At least one exemplary embodiment of the present invention includes a user interface comprising an audible rendering of a call setup request indication, said audible rendering ceasing upon receipt of a result of a call setup request.

BRIEF DESCRIPTION OF THE DRAWINGS

The invention and its wide variety of potential embodiments will be readily understood via the following detailed description of certain exemplary embodiments, with reference to the accompanying drawings in which.

DETAILED DESCRIPTION

In certain telecommunications architectures, such as Voice over IP, there can be noticeable call setup delays or post-dial delays (PDD). When such delays are sufficiently long, the caller can hear extended silence and thereby become confused and/or frustrated by the perception that the call is not proceeding. Accordingly, the caller can needlessly hang-up and re-dial.

At least one exemplary embodiment of the present invention includes a method comprising providing a call setup request to a network, such as via initiating a telephone call, and receiving an indication that the call setup request is being processed.

Figure 1:
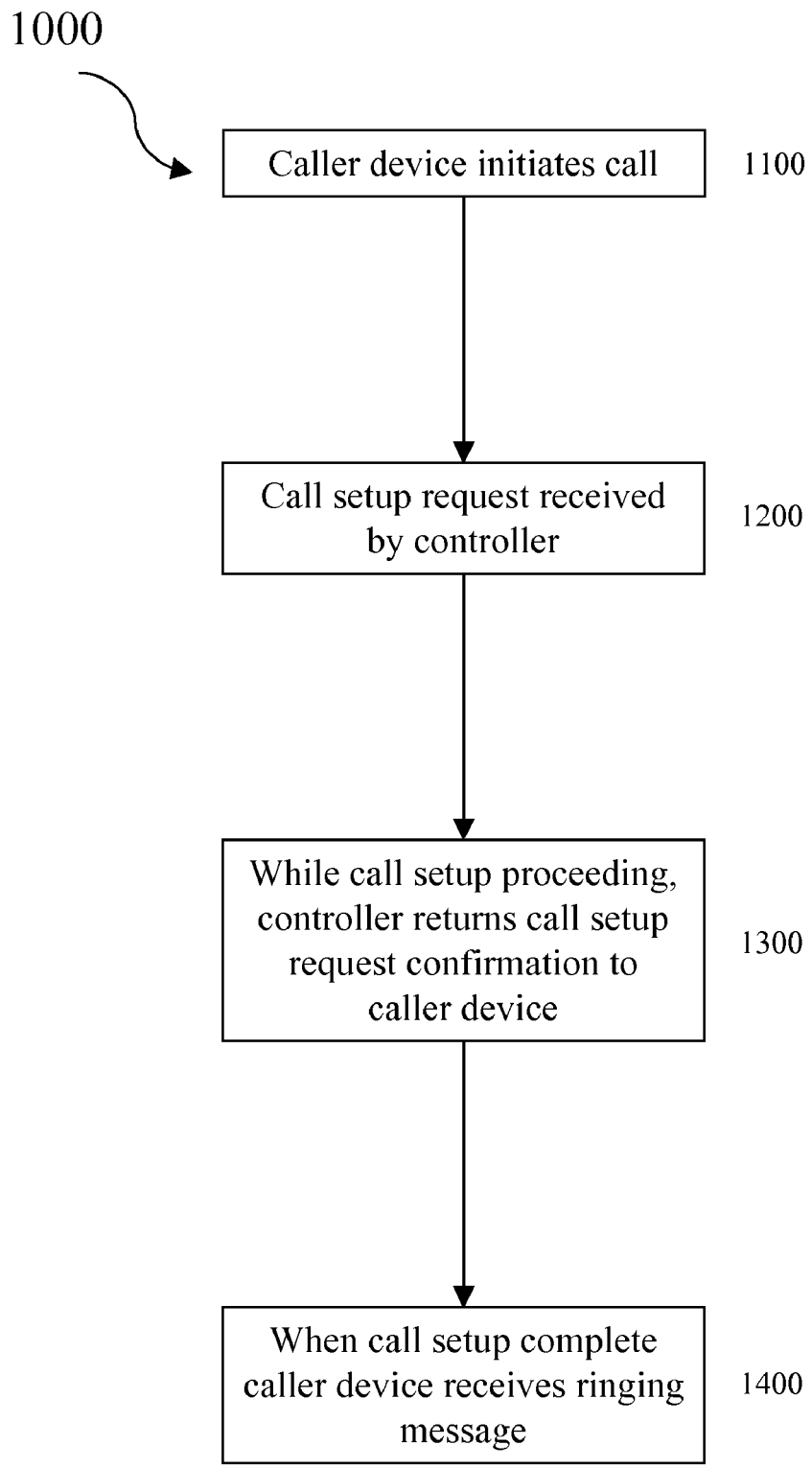
FIG. 1 is a flow diagram of an exemplary embodiment of a method 1000 of the present invention.

FIG. 1 is a flow diagram of an exemplary embodiment of a method 1000 of the present invention. At activity 1100, a caller initiates a call on a telephone and/or telephonic device, such as a Voice over IP device. At activity 1200, a call setup request is propagated through a network by, for example, a PBX, switch, and/or router, to arrive at a controller. At activity 1300, the controller propagates the call setup request, and while call setup is proceeding and/or being processed, the controller can return a call setup request confirmation through the network. The call setup request confirmation can result in the caller perceiving an audible and/or visual indication that call setup is proceeding. At activity 1400, when call set-up is complete, the controller can send a message to that effect through the network. As a result, the caller can perceive a ringing tone. If call-set up was unsuccessful due to the called party's line being busy, the controller can send a message to that effect, such that the caller receives a busy tone.

Figure 2:
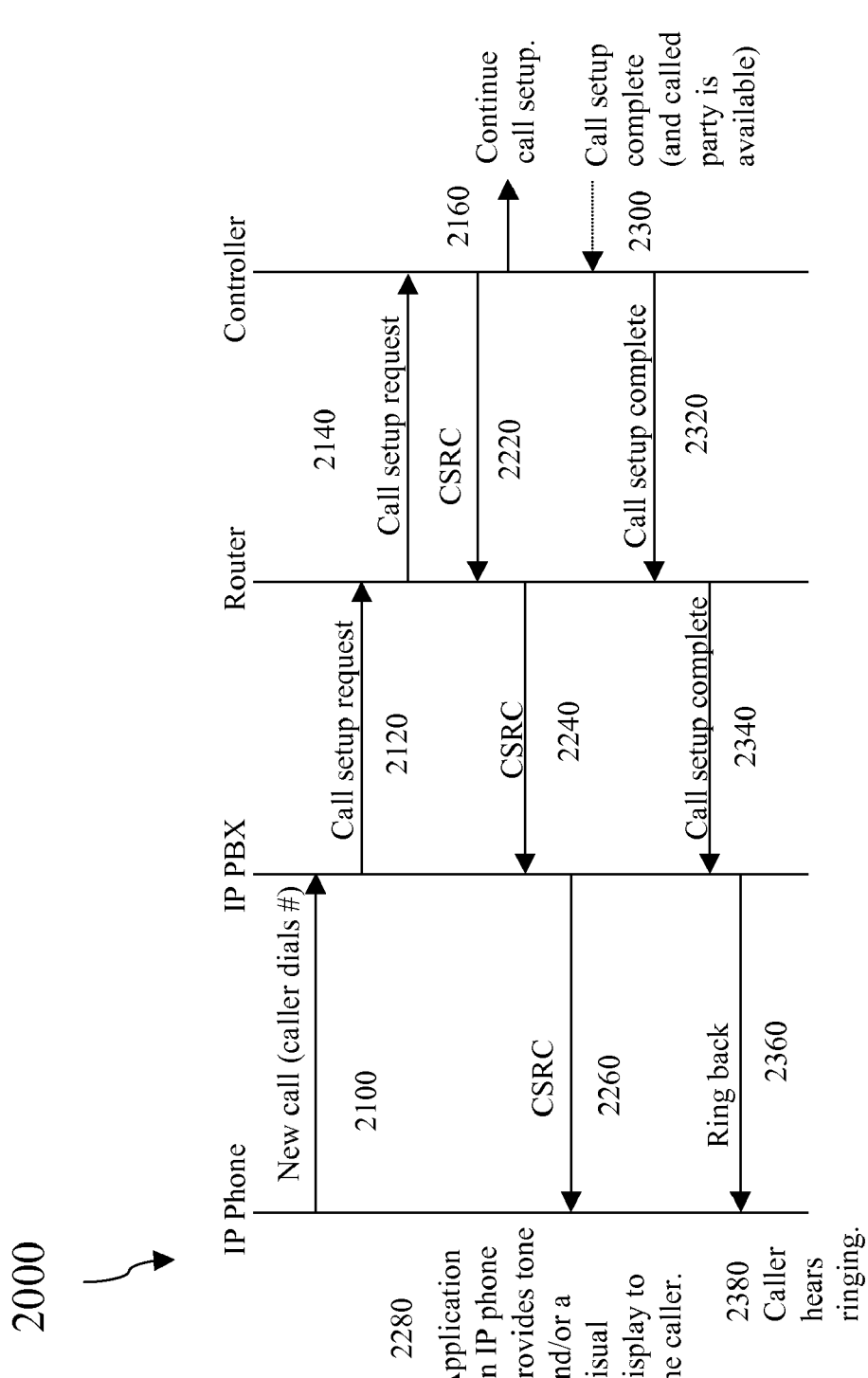
FIG. 2 is a flow diagram of an exemplary embodiment of a method 2000 of the present invention.

FIG. 2 is a flow diagram of an exemplary embodiment of a method 2000 of the present invention. At activity 2100, a caller can place a new call from an IP phone to an IP PBX. At activity 2120, the IP PBX can provide a call setup request to a router. As used herein, the term "call setup request" is a generic term referring to any call setup request message and/or signal. In certain embodiments, the call setup request can be an H.225 setup request in H.323, an SIP invite, and/or a similar MGCP and/or MEGACO message. In certain embodiments, the call set request can be any form of voice over IP message or signal.

At activity 2140, the router can provide a call setup request to a controller. As used herein, the term "controller" is used generically. Depending upon the network architecture, the controller can include a component containing call processing logic, or can include a component that does not contain call processing logic, such as a border element and/or a network gateway.

At activity 2160, the controller can provide a call setup request in a direction of the called party. At activity 2220, the controller can respond to the received call setup request by providing a signal and/or message containing a call setup request confirmation (CSRC) to the router. At activity 2240, the router can provide a CSRC to the IP PBX. At activity 2260, the IP PBX can provide a CSRC to the IP phone. At activity 2280, the IP phone can provide a CSRC, in the form of an audible and/or visible indicator, to the caller to indicate that call setup is proceeding. That is, at a user interface, such as an audible and/or graphical user interface, an audible and/or or visual indicator can be rendered that indicates that call setup is proceeding. Thus, the CSRC can take one or more of many forms, including an in-band and/or out-of-band control signal, an audible indicator, and/or a visual indicator.

At activity 2300, when call setup is complete, and the called party is available, the controller can receive a call setup complete message. At activity 2320, the controller can provide a call setup complete message to the router, which, at activity 2340, can provide a call setup complete message to the IP PBX. In an alternative embodiment, the network can provide a ring back message to the IP PBX. At activity 2360, the IP PBX can provide a ring back message to the IP phone. At activity 2380, the IP phone can provide an audible and/or visual ringing indicator to the caller. If the called party's line is busy or a network announcement is returned, a busy tone and/or the announcement can be provided by the IP phone.

Figure 3:
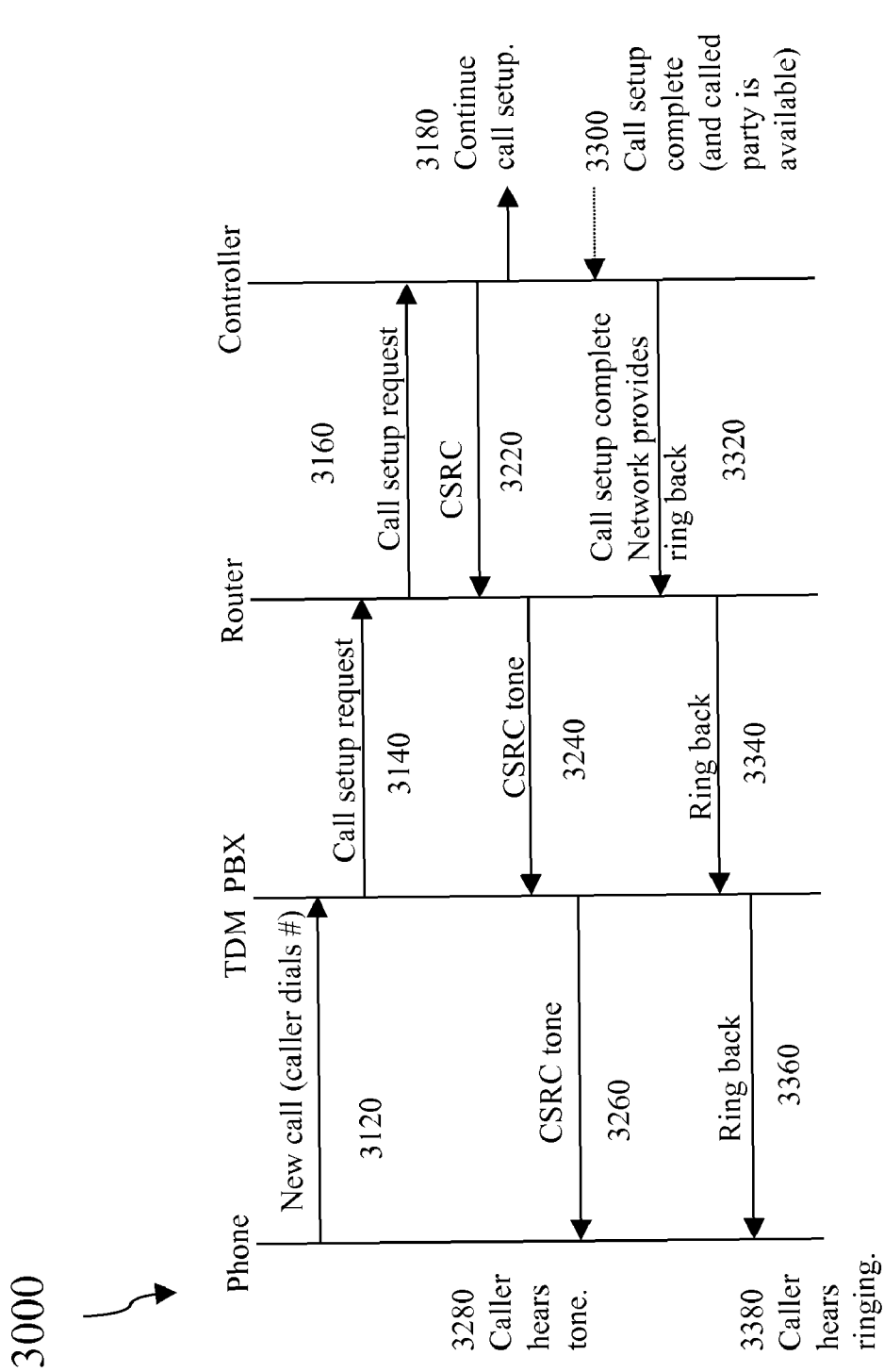
FIG. 3 is a flow diagram of an exemplary embodiment of a method 3000 of the present invention.

FIG. 3 is a flow diagram of an exemplary embodiment of a method 3000 of the present invention. At activity 3120, a caller can place a new call from telephone to a TDM PBX. At activity 3140, the TDM PBX can provide a call setup request to a router. As used herein, the term "call setup request" is a generic term referring to any call setup request message and/or signal. In certain embodiments, the call setup request can be an H.225 setup request in H.323, an SIP invite, and/or a similar MGCP and/or MEGACO message.

At activity 3160, the router can provide a call setup request to a controller. As used herein, the term "controller" is used generically. Depending upon the network architecture, the controller can include a component containing call processing logic, or can include a component that does not contain call processing logic, such as a border element and/or a network gateway.

At activity 3180, the controller can provide a call setup request in a direction of the called party. At activity 3220, the controller can respond to the received call setup request by providing a signal and/or message containing a call setup request confirmation (CSRC) to the router. At activity 3240, the router can provide a CSRC to the TDM PBX. At activity 3260, the TDM PBX can provide a CSRC to the telephone. At activity 3280, the telephone can provide a CSRC, in the form of an audible and/or visible indicator, to the caller to indicate that call setup is proceeding. Thus, the CSRC can take one or more of many forms, including an in-band and/or out-of-band control signal, an audible indicator, and/or a visual indicator.

At activity 3300, when call setup is complete, and the called party is available, the controller can receive a call setup complete message. At activity 3320, the controller can provide a call setup complete message to the router. At activity 3340, router can provide a ring back message to the TDM PBX. At activity 3360, the TDM PBX can provide a ring back message to the telephone. The call setup complete message and/or ring back message terminates the CSRC. At activity 3380, the telephone can provide an audible ringing indicator to the caller. If the called party's line is busy or a network announcement is returned, a busy tone and/or the announcement can be provided by the telephone.

Figure 4:
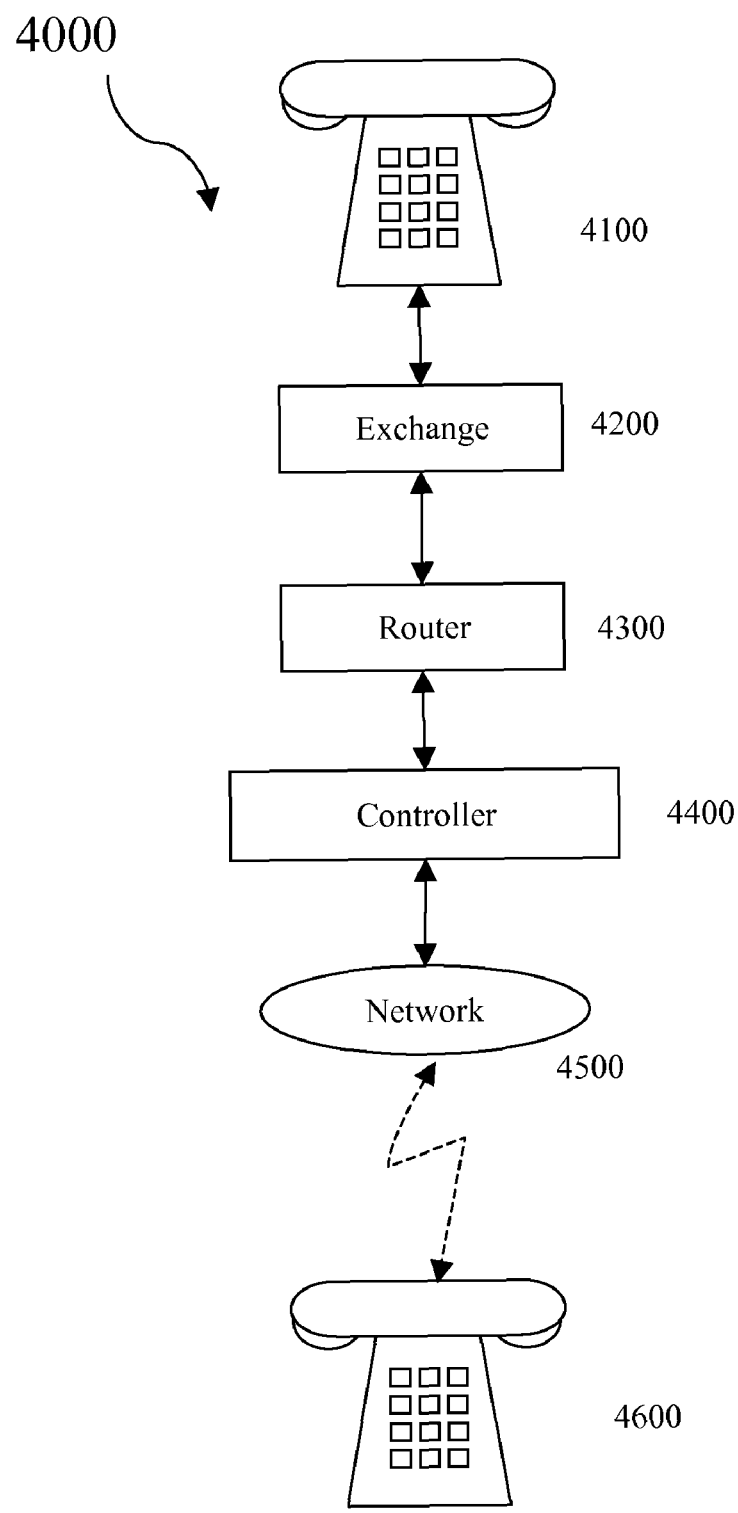
FIG. 4 is a block diagram of an exemplary embodiment of a system 4000 of the present invention.

FIG. 4 is a block diagram of an exemplary embodiment of a system 4000 of the present invention. Telephone device 4100, such as a traditional telephone, a cellular telephone, a Voice over IP phone ("IP phone"), etc., can be connected to an exchange 4200, such as a PBX or central switching office. When a caller using telephone device 4100 initiates a call, exchange 4200 can provide a call setup request via a switch and/or router 4300. The call setup request can be received by a controller 4400, which can possess suitable circuitry, logic, programming, and/or other form of machine intelligence to provide a call setup request confirmation ("CSRC") back to router 4300, and propagate a call setup request through a network 4500 toward a called party telephone line 4600. From router 4300, the CSRC can be provided to exchange 4200 and then to telephone device 4100, which can provide an audible and/or visual CSRC to the caller. Note that in certain embodiments, exchange 4200 and/or router 4300 can be eliminated, such that telephone device 4100 can be directly connected to controller 4400.

Any of devices 4100, 4200, 4300, 4400, and/or 4500 can be coupled to, and/or include one or more databases (not shown). For example, controller 4400 can be coupled to a database that specifies the type of CSRC selected for telephone device 4100. As another example, a telephone device 4100 can be programmed to provide a chosen type of CSRC indicator in response to receiving a CSRC message and/or signal.

In various exemplary embodiments, a wide variety of CSRC's are contemplated, including audible and/or visual indicators. Moreover, the CSRC can be selected by a service provider, a customer, and/or a caller. That is, although the telephone line to which telephone device 4100 is connected might be billed in the name of a father (the customer), a teenaged son of the father might be the caller for a particular call, and might choose a particular type of call request setup confirmation.

The CSRC can be changed. For example, at a given point in time, someone associated with telephone device 4100 might select a particular CSRC tone. At another point in time, the customer and/or a caller associated with telephone device 4100 might select a different CSRC tone.

The CSRC can be variable. For example, a CSRC tone can be variable in pitch, amplitude, duration, etc. By way of further example, a caller can select a tone that becomes louder and/or higher in pitch the longer it is played (that is, the longer the call setup takes to be completed and/or terminated). As another example, a caller can select a clicking sound in which the clicks become longer or shorter in duration the longer the call setup proceeds.

The CSRC can be an audible announcement. For example, the CSRC can be an audible announcement, perhaps repetitively, of the directory name associated with the called number. As another example, the CSRC can be an audible advertisement, potentially for classes, manufacturers, and/or providers of goods and/or services selected by the service provider, customer, and/or caller. As yet another example, the CSRC can be music, potentially of a variety selected by the service provider, customer, and/or caller.

The CSRC can be visual, and can be displayed on a light, display, screen, and/or monitor. For example, the CSRC can be an illuminated and/or pulsing light and/or LED. As another example, the CSRC can be a graphical hourglass, spinning beach ball, stopwatch, progress bar, etc. As yet another example, the CSRC can be an animated figure, such as a runner, an animal, an insect, etc. As still another example, the CSRC can a slideshow of chosen photographs, advertisements, announcements, etc.

The CSRC can be both audible and visual. For example, the CSRC can be music and a light that blinks with gradually increasing frequency or gradually changing color.

Figure 5:
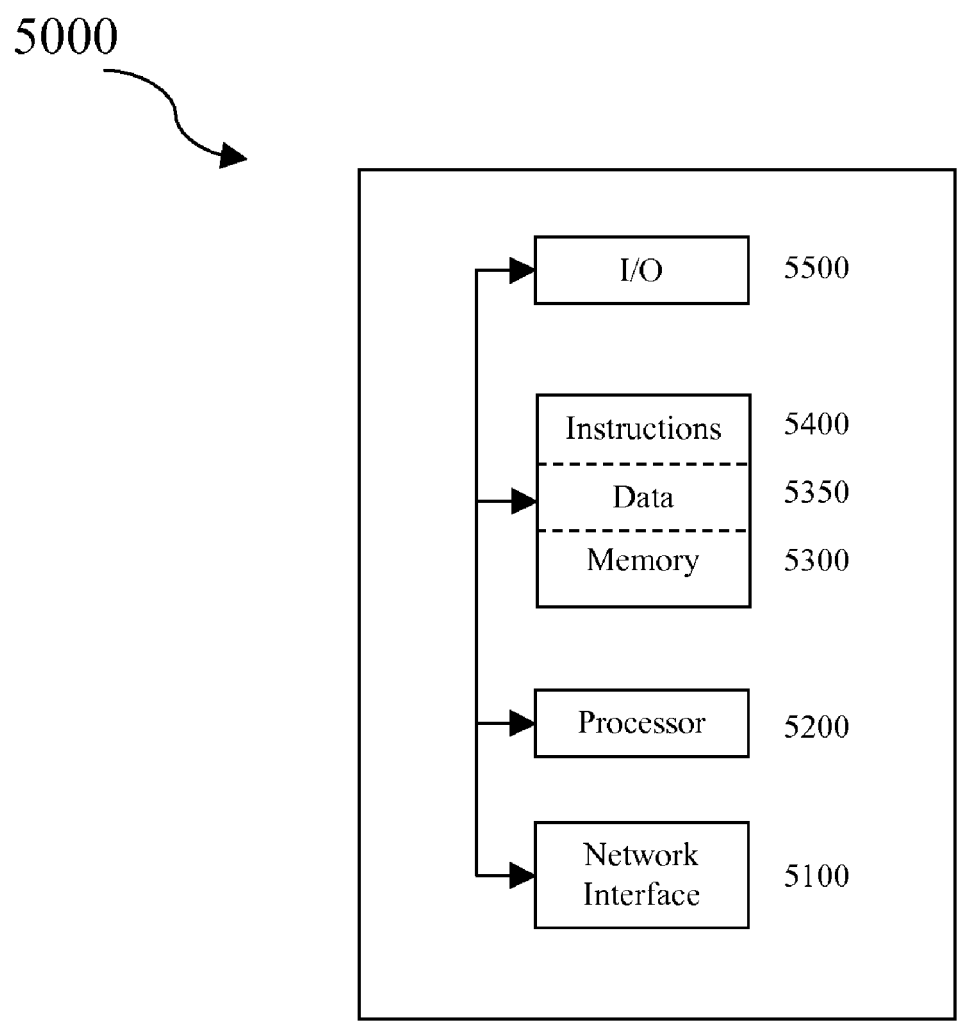
FIG. 5 is a block diagram of an exemplary embodiment of an information device 5000 of the present invention.

FIG. 5 is a block diagram of an exemplary embodiment of a generic information device 5000 of the present invention. Information device 5000 can represent telephone device 4100, exchange 4200, router 4300, and/or controller 4400. In certain embodiments, information device 5000 can be implemented as a telephone, a cellular telephone, an IP telephone, etc. In certain embodiments, information device 5000 can be implemented on a general purpose or special purpose computer, such as a personal computer, workstation, minicomputer, mainframe, supercomputer, laptop, and/or Personal Digital Assistant (PDA), etc., a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing the at least a portion of a method described herein may be used for information device 5000.

Information device 5000 can include multiple interconnected components, such as one or more communication interfaces 5100, one or more processors 5200, one or more memories 5300 containing instructions 5400, and/or one or more input/output (I/O) devices 5500, etc.

In one embodiment, communication interface 5100 can be a bus, a connector, a telephone line interface, a wireless network interface, a cellular network interface, a local area network interface, a broadband cable interface, a telephone, a cellular phone, a cellular modem, a telephone data modem, a fax modem, a wireless transceiver, an Ethernet card, a cable modem, a digital subscriber line interface, a bridge, a hub, a router, or other similar device.

Each processor 5200 can be a commercially available general-purpose microprocessor. In certain embodiments, the processor can be an Application Specific Integrated Circuit (ASIC), Field Programmable Gate Array (FPGA), or the like, that has been designed to implement in its hardware and/or firmware at least a part of a method in accordance with an embodiment of the present invention.

Memory 5300 can be coupled to processor 5200 and can comprise any device capable of storing analog or digital information, such as a hard disk, Random Access Memory (RAM), Read Only Memory (ROM), flash memory, a compact disk, a digital versatile disk (DVD), a magnetic tape, a floppy disk, and any combination thereof. Memory 5300 can comprise data 5350, such as one or more databases, tables, data repositories, archives, and/or any other data storage technique and/or form of stored data. Memory 5300 also can comprise and/or store instructions 5400 adapted to be executed by processor 5200 according to one or more activities of a method of the present invention.

Instructions 5400 can be embodied in software, which can take any of numerous forms that are well known in the art. Instructions 5400 can control operation of information device 5000 and/or one or more other devices, systems, or subsystems.

Input/output (I/O) device 5500 can be an audio and/or visual device, including, for example, a light, LED, monitor, display, keyboard, keypad, touchpad, pointing device, microphone, speaker, video camera, camera, scanner, and/or printer, including a port to which an I/O device can be attached, connected, and/or coupled.

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. Also, references specifically identified and discussed herein are incorporated by reference as if fully set forth herein. Accordingly, the drawings and descriptions are to be regarded as illustrative in nature, and not as restrictive.

What is claimed is:

1. A method, comprising:
    providing an indication that a call setup request is being processed in response to the call setup request being received at an internet protocol private branch exchange;
    receiving a call setup request confirmation in response to the call setup request being received at the internet protocol private branch exchange;
    providing a ring back message to the internet protocol private branch exchange in response to a call setup completed message, wherein the internet protocol private branch exchange causes a voice over internet protocol device to provide a ring back as an indicator of call setup completion; and
    terminating the call setup request confirmation in response to the call setup completed message.

2. The method of claim 1, further comprising:
    providing the indication in response to the call setup request confirmation as an out of band signal, wherein the indication comprises an audible announcement of a directory name associated with a called number, wherein the call setup request is received from the voice over internet protocol device at the internet protocol private branch exchange, and wherein the call setup request is an invite.

3. The method of claim 1, further comprising:
    ceasing the indication when call setup is complete.

4. The method of claim 1, further comprising:
    rendering the indication as a visual representation of a stopwatch.

5. The method of claim 1, wherein:
    the call setup request relates to a cellular telephone call.

6. The method of claim 1, wherein:
    the indication is a repetitive audible announcement of a directory name associated with a called number.

7. The method of claim 1, wherein:
    the indication comprises a visual portion of an animated figure of an animal.

8. The method of claim 1, wherein:
    the indication comprises music.

9. The method of claim 1, wherein:
    the indication comprises an animated figure of a runner.

10. The method of claim 1, wherein:
    the indication comprises an advertisement.

11. The method of claim 1, wherein:
    the indication comprises a caller selected slideshow of announcements.

12. The method of claim 1, wherein:
    the indication comprises a caller selectable slideshow of photographs.

13. The method of claim 1, wherein:
    the indication comprises a caller adjustable slideshow of advertisements.

14. The method of claim 1, wherein:
    the indication is provided via a voice over internet protocol signal.

15. A system, comprising:
    a processor configured to:
        provide an indication that a call setup request is being processed in response to the call setup request being received at an internet protocol private branch exchange, wherein the call setup request is a media gateway control protocol request;
    receiving a call setup request confirmation in response to the call setup request being received at the internet protocol private branch exchange;
    provide a ring back message to the internet protocol private branch exchange in response to a call setup completed message, wherein the internet protocol private branch exchange causes a voice over internet protocol device to provide a ring back as an indicator of call setup completion; and
    terminating the call setup request confirmation in response to the call setup completed message.

16. A computer-readable medium containing instructions for activities comprising:
    providing an indication that a call setup request is being processed in response to the call setup request being received at an internet protocol private branch exchange, wherein the call setup request is a megaco request;
    receiving a call setup request confirmation in response to the call setup request being received at the internet protocol private branch exchange;
    providing a ring back message to an internet protocol private branch exchange in response to a call setup completed message, wherein the internet protocol private branch exchange causes a voice over internet protocol device to provide a ring back as an indicator of call setup completion and
    terminating the call setup request confirmation in response to the call setup completed message.

* * * * *